(12) United States Patent
Cao

(10) Patent No.: US 9,998,441 B2
(45) Date of Patent: Jun. 12, 2018

(54) CLIENT AUTHENTICATION USING SOCIAL RELATIONSHIP DATA

(71) Applicant: Alibaba Group Holding Limited, Grand Cayman (KY)

(72) Inventor: Kai Cao, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 141 days.

(21) Appl. No.: 14/606,618

(22) Filed: Jan. 27, 2015

(65) Prior Publication Data

US 2015/0215304 A1    Jul. 30, 2015

(30) Foreign Application Priority Data

Jan. 28, 2014   (CN) .......................... 2014 1 0040993

(51) Int. Cl.
*H04L 29/06* (2006.01)
*G06F 21/32* (2013.01)
*G06F 15/16* (2006.01)

(52) U.S. Cl.
CPC ............ *H04L 63/08* (2013.01); *H04L 63/102* (2013.01); *G06F 15/16* (2013.01); *G06F 21/32* (2013.01); *H04L 29/06* (2013.01)

(58) Field of Classification Search
CPC ....... H04L 63/08; H04L 63/102; H04L 29/06; G06F 15/16; G06F 21/32
See application file for complete search history.

(56) References Cited

U.S. PATENT DOCUMENTS

| 8,302,187 | B1* | 10/2012 | Gupta | H04L 65/1079 713/182 |
| 8,869,306 | B2* | 10/2014 | Kelley | G06F 17/30424 705/51 |
| 8,875,291 | B2* | 10/2014 | Hu | G06F 21/552 713/189 |
| 8,904,013 | B2* | 12/2014 | Papakipos | H04L 51/32 709/227 |
| 8,943,557 | B2* | 1/2015 | Kelley | H04L 29/08657 380/258 |
| 8,966,602 | B2* | 2/2015 | Gandhi | H04L 9/3271 726/7 |

(Continued)

FOREIGN PATENT DOCUMENTS

| CN | 101751629 A1 | 6/2010 |
| WO | WO2013049359 | 4/2013 |
| WO | WO2013098472 | 7/2013 |

OTHER PUBLICATIONS

PCT Search Report and Written Opinion dated Apr. 13, 2015 for PCT Application No. PCT/US15/13058, 8 Pages.

(Continued)

Primary Examiner — Beemnet Dada
Assistant Examiner — Stephen Gundry
(74) Attorney, Agent, or Firm — Lee & Hayes, PLLC

(57) ABSTRACT

A method and an apparatus for client authentication. The server receives from a client a request for identity authentication corresponding to a user account. A social relationship similarity is computed as a result of matching social relationship data of the client and the stored social relationship data of the user account. If the similarity meets a preset passing condition, the client is allowed to pass the identity authentication.

20 Claims, 3 Drawing Sheets

(56) References Cited

U.S. PATENT DOCUMENTS

| | | | |
|---|---|---|---|
| 9,009,232 B2* | 4/2015 | Ye | G06Q 10/10 709/205 |
| 9,043,870 B1* | 5/2015 | Barenholz | H04L 63/0815 726/2 |
| 9,094,388 B2* | 7/2015 | Tkachev | H04L 63/08 |
| 9,098,819 B1* | 8/2015 | Korula | G06Q 10/0635 |
| 9,166,961 B1* | 10/2015 | Johansson | H04L 63/08 |
| 9,223,968 B2* | 12/2015 | Hu | G06F 21/552 |
| 9,432,352 B2* | 8/2016 | Ye | G06Q 10/10 |
| 9,544,283 B2* | 1/2017 | Ye | H04L 63/08 |
| 9,558,524 B2* | 1/2017 | Madhu | G06Q 50/265 |
| 9,628,462 B2* | 4/2017 | Gonser | H04L 63/08 |
| 9,628,484 B2* | 4/2017 | Perrone, II | H04L 63/0892 |
| 9,712,529 B2* | 7/2017 | Mo | H04L 51/32 |
| 9,727,886 B2* | 8/2017 | Rubinstein | G06Q 30/0224 |
| 2006/0117378 A1* | 6/2006 | Tam | G06F 21/10 726/3 |
| 2007/0033139 A1* | 2/2007 | Handler | G06Q 20/10 705/44 |
| 2008/0148366 A1 | 6/2008 | Wahl | |
| 2009/0117883 A1* | 5/2009 | Coffing | H04W 4/21 455/414.1 |
| 2009/0320101 A1* | 12/2009 | Doyle, III | G06F 21/31 726/4 |
| 2010/0050233 A1* | 2/2010 | Ross | G06F 21/33 726/2 |
| 2010/0088753 A1 | 4/2010 | Ayres et al. | |
| 2010/0153451 A1 | 6/2010 | Delia et al. | |
| 2010/0192205 A1* | 7/2010 | Chaudhry | G06F 21/31 726/5 |
| 2010/0325040 A1* | 12/2010 | Etchegoyen | G06F 21/31 705/39 |
| 2011/0047598 A1 | 2/2011 | Lindley et al. | |
| 2011/0113056 A1* | 5/2011 | Ye | H04L 63/08 707/769 |
| 2011/0113101 A1* | 5/2011 | Ye | G06Q 10/10 709/205 |
| 2011/0125845 A1 | 5/2011 | Mo et al. | |
| 2012/0066758 A1 | 3/2012 | Kasturi | |
| 2012/0158589 A1* | 6/2012 | Katzin | G06Q 20/12 705/44 |
| 2012/0159647 A1 | 6/2012 | Sanin et al. | |
| 2012/0166533 A1* | 6/2012 | Rubinstein | G06Q 30/0224 709/204 |
| 2013/0019289 A1* | 1/2013 | Gonser | G06F 21/64 726/6 |
| 2013/0041909 A1* | 2/2013 | Coleman | H04L 63/102 707/758 |
| 2013/0054433 A1* | 2/2013 | Giard | H04L 67/22 705/34 |
| 2013/0055367 A1* | 2/2013 | Kshirsagar | G06F 21/316 726/6 |
| 2013/0097682 A1* | 4/2013 | Zeljkovic | H04L 9/3231 726/7 |
| 2013/0117832 A1* | 5/2013 | Gandhi | H04L 9/3271 726/7 |
| 2013/0144785 A1* | 6/2013 | Karpenko | G06Q 20/409 705/44 |
| 2013/0160144 A1 | 6/2013 | Mok et al. | |
| 2013/0198274 A1* | 8/2013 | Papakipos | H04L 51/32 709/204 |
| 2013/0204787 A1 | 8/2013 | Dubois | |
| 2013/0227700 A1* | 8/2013 | Dhillon | G06Q 50/01 726/26 |
| 2013/0238600 A1 | 9/2013 | Kindler et al. | |
| 2013/0276115 A1* | 10/2013 | Hu | G06F 21/552 726/23 |
| 2013/0304646 A1* | 11/2013 | de Geer | G06Q 20/16 705/44 |
| 2013/0333013 A1* | 12/2013 | Quach | H04L 9/3215 726/7 |
| 2014/0006283 A1* | 1/2014 | Hogg | G06Q 20/10 705/44 |
| 2014/0006297 A1* | 1/2014 | Hogg | G06Q 10/101 705/319 |
| 2014/0047030 A1* | 2/2014 | Mo | H04L 51/32 709/204 |
| 2014/0157381 A1* | 6/2014 | Disraeli | G06F 21/31 726/7 |
| 2014/0165178 A1* | 6/2014 | Perrone, II | H04L 63/0892 726/9 |
| 2014/0208389 A1* | 7/2014 | Kelley | H04L 29/08657 726/4 |
| 2014/0208440 A1* | 7/2014 | Kelley | G06F 17/30424 726/29 |
| 2014/0222478 A1* | 8/2014 | Wang | G06Q 10/06311 705/7.13 |
| 2014/0237570 A1* | 8/2014 | Shishkov | G06F 21/316 726/7 |
| 2014/0245411 A1* | 8/2014 | Meng | H04L 63/08 726/7 |
| 2014/0282870 A1 | 9/2014 | Markwordt et al. | |
| 2014/0282930 A1 | 9/2014 | Markwordt et al. | |
| 2014/0282946 A1 | 9/2014 | Fortenot et al. | |
| 2014/0282977 A1* | 9/2014 | Madhu | G06Q 50/265 726/7 |
| 2014/0331278 A1* | 11/2014 | Tkachev | H04L 63/08 726/1 |
| 2014/0331282 A1* | 11/2014 | Tkachev | H04L 63/08 726/3 |
| 2015/0032628 A1* | 1/2015 | Randall | G06Q 20/40 705/44 |
| 2015/0046327 A1* | 2/2015 | Taupitz | G06Q 20/227 705/44 |
| 2015/0047003 A1* | 2/2015 | Khan | H04L 63/08 726/7 |
| 2015/0095986 A1* | 4/2015 | Karpey | H04L 63/08 726/4 |
| 2015/0112864 A1* | 4/2015 | Wallaja | G06Q 20/322 705/44 |
| 2015/0113625 A1* | 4/2015 | Gandhi | H04L 9/3271 726/7 |
| 2015/0120552 A1* | 4/2015 | He | G06Q 20/42 705/44 |
| 2015/0127439 A1* | 5/2015 | Campos De Figueiredo Faceira | G06Q 30/0222 705/14.16 |
| 2015/0128240 A1* | 5/2015 | Richards | H04L 63/0861 726/7 |
| 2015/0150090 A1* | 5/2015 | Carroll | G06F 21/316 726/3 |
| 2015/0186875 A1* | 7/2015 | Zhang | G06Q 20/382 705/44 |
| 2015/0186890 A1* | 7/2015 | Li | G06Q 20/4014 705/44 |
| 2015/0188915 A1* | 7/2015 | Li | H04L 63/126 705/44 |
| 2015/0237030 A1* | 8/2015 | Ye | G06Q 10/10 709/206 |
| 2016/0014128 A1* | 1/2016 | Perrone, II | H04L 63/0892 726/7 |
| 2016/0072824 A1* | 3/2016 | Johansson | H04L 63/08 726/7 |
| 2016/0132677 A1* | 5/2016 | Cross | G06F 21/45 726/6 |
| 2016/0162963 A1* | 6/2016 | Gandhi | H04L 9/3271 705/26.35 |
| 2016/0203575 A1* | 7/2016 | Madhu | G06Q 50/265 705/319 |
| 2016/0239918 A1* | 8/2016 | Lambur | G06Q 40/06 |
| 2016/0255078 A1* | 9/2016 | Zhang | H04L 63/18 726/4 |
| 2016/0267475 A1* | 9/2016 | Xu | G06Q 20/00 |
| 2016/0283740 A1* | 9/2016 | Roundtree | G06F 21/6245 |
| 2016/0337331 A1* | 11/2016 | Ye | G06Q 10/10 |
| 2016/0353282 A1* | 12/2016 | Richards | H04L 63/0861 |
| 2017/0104744 A1* | 4/2017 | Ye | H04L 63/08 |

(56) References Cited

U.S. PATENT DOCUMENTS

2017/0111385 A1\* 4/2017 Madhu ................ H04L 63/1433
2017/0116610 A1\* 4/2017 Gandhi .............. G06Q 20/4014

OTHER PUBLICATIONS

Extended European Search Report dated Jul. 26, 2017 for European Patent Application No. 15743818.5, 7 pages.
Chinese Office Action dated Dec. 21, 2017 for Chinese patent application No. 201410040993.5, a counterpart foreign applicatin of U.S. Appl. No. 14/606,618, (English machine translation attached), 12 pages.
Chinese Office Action dated Jul. 5, 2017 for Chinese patent application No. 201410040993.5, a counterpart foreign applicatin of U.S. Appl. No. 14/606,618, (English machine translation attached), 11 pages.

\* cited by examiner

CLIENT AUTHENTICATION USING SOCIAL RELATIONSHIP DATA

RELATED PATENT APPLICATIONS

This application claims foreign priority to Chinese Patent Application No. 2014/10040993.5 filed on Jan. 28, 2014, entitled "METHOD, APPARATUS AND SYSTEM FOR CLIENT AUTHENTICATION USING SOCIAL RELATIONSHIP DATA", Chinese Patent Application is hereby incorporated by reference in its entirety.

TECHNICAL FIELD

This application relates to the field of identity authentication, specifically to a method, an apparatus and system for client identity authentication using social relationship data.

BACKGROUND

With the development of the Internet, Internet-based applications such as Internet banking, online shopping, social media, e-commerce, instant messaging and other applications that provide users with a variety of services, are increasing. In order to facilitate user management and for security reasons, the majority of Internet applications require users to log in before using the service. For example, the user is required to enter a user account name and the corresponding password (also known as passcode) on the login screen of a PC or mobile device display, and allowed to enter to use the services provided by the application only after the user identity is verified by the server.

Using "account+password" authentication method is relatively easy, but an occurrence of an account and password theft causes inconvenience and even economic losses to the user. In order to prevent this from happening, the mobile Internet services have started to use new forms of security measures such as bonding a mobile device for authorization. For example, before being allowed to use a mobile application on a mobile device for some sensitive operations (e.g., account login, password changing, making a payment, and viewing account information, etc.), the user is required to bond the user's application account with an authorized mobile device used by the user to logon and use the application account. Specifically, the user can only use the authorized bound mobile communications device to perform sensitive operations. This measure could avoid unauthorized use of stolen accounts and passwords by providing additional security for user accounts. If the user replaces the mobile device, a procedure can be used to change or update the bonding relationship between the account and mobile communications device.

In the traditional technical conditions, the above bonding authorization process and the bonding change process are implemented using SMS-based verification codes only. The process typically includes the following steps:

1) user submits on a mobile device a bonding request or a change bonding request through the user interface provided by a mobile application;

2) mobile application provider sends an SMS message containing a dynamic verification code to the user;

3) user enters the dynamic verification code according to the guide in the bound mobile application user interface; and 4) the system completes the bonding authorization after a successful verification by mobile application provider.

In practical applications, the above bonding authorization process poses quite serious security risks. First, if a thief has stolen the user's account and password, the thief can perform the initial bonding operations using his own mobile device. Second, due to the current network environment, the SMS verification code leak problem is serious. Even if the user has an account already bounded with an authorized mobile device, upon stealing the user's account and password, a thief may still be able to change the bonding using SMS diversion through deception or by using Trojans installed on the user mobile device to obtain an SMS text message verification code. Using such fraudulent means, the thief may be able to replace the user's mobile device that is already authorized by his own mobile device.

As the existing technologies are unable to identify whether a client device really belongs to an account owner, but can only achieve bonding authorization using an SMS verification code, an application provider cannot determine if a client device to be bound with an account really belongs to the account holder. That is, the application providers are unable to eliminate such security risks, and as result may allow a thief's device to be bound to a user account, providing an illegitimate opportunity to the thief, but causing unnecessary trouble as well as economic losses to the legitimate user.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter.

One aspect of the disclosure is a method of client identity authentication. The server receives from a client a request for identity authentication corresponding to a user account. The method computes a social relationship similarity as a result of matching social relationship data of the client and the stored social relationship data of the user account. If the similarity meets a preset passing condition, the client is allowed to pass the identity authentication.

To obtain the stored social relationship data of the user account, the method analyzes the collected data to extract social relationship data related to the user account and stores the extracted social relationship data related to the user account.

To obtain the social relationship similarity, the server may send the stored social relationship data of the user account to the client, and receive from the client the result of matching the social relationship data of the client and the stored social relationship data of the user account. Alternatively, the server may receive from the client the social relationship data of the client, and compute the similarity by matching the social relationship data of the client and the stored social relationship data of the user account.

In an embodiment, the method also determines whether the similarity meets a preset alert condition, and if affirmative, denies the identity authentication and takes an alert action.

The social relationship similarity may include a matching number and/or a matching level, where the matching number is defined as a total number of items that are found to match between the stored social relationship data of the user account and the social relationship data of the client, and the matching level is defined as a ratio between the matching number and the total number of items found in the stored social relationship data. To determine whether the similarity meets a preset passing condition, the method may determine whether the matching number and/or the matching level are, respectively, greater than a threshold value of the matching number and/or the matching level. The method may further determine whether the similarity meets a preset alert condition, and if affirmative, deny the identity authentication and taking an alert action. The preset alert condition may be that the matching number and/or the matching level is, respectively, less than a threshold value of the matching number and/or the matching level.

The social relationship data may include any of a phone number, an instant communication application number such as a QQ number and a WeChat™ number, a correspondence account number, an address book, or a pay-for-another record.

Another aspect of the disclosure is an apparatus for identity authentication. The apparatus has a computing device programmed to have functional units including: an authentication request receiving unit for receiving from a client a request for identity authentication corresponding to a user account; a matching result acquiring unit for acquiring a similarity as a result of matching the social relationship data of the client and the stored social relationship data of the user account; and a pass determining unit for determining whether the similarity meets a preset passing condition, and if affirmative, allowing the client to pass the identity authentication.

The apparatus may further have a social relationship data generating unit for acquiring and storing the social relationship data of the user account. The social relationship data generating unit may include an analyzing and extracting subunit for analyzing the acquired data to extract social relationship data related to the user account, and a storage unit for storing the extracted social relationship data related to the user account.

The matching result acquiring unit may include a social relationship data sending subunit for sending the stored social relationship data of the user account to the client, and a matching result receiving unit for receiving from the client the result of matching the social relationship data of the client and the stored social relationship data of the user account.

The matching result acquiring unit may also include a social relationship data receiving subunit for receiving from the client the social relationship data of the client, and a matching result computing unit for computing the similarity by matching the social relationship data of the client and the stored social relationship data of the user account.

In an embodiment, the apparatus has an alert determining unit for determining whether the similarity meets a preset alert condition, and if affirmative, denying the identity authentication and taking an alert action.

According to another embodiment of the method for client authentication, a client sends to a server a request for identity authentication corresponding to a user account, and sends to the server authentication information of a client to allow the server to authenticate the client based on the social relationship data of the client. The client then receives from the server a reply of whether the client has passed the identity authentication.

The social relationship data of the client may be locally stored in a client device.

To send to the server information of the client, the client may first receive from the server social relationship data of the user account, compute a similarity as a result of matching social relationship data of the client and the social relationship data of the user account, and then send the similarity in the matching result to the server.

According to another embodiment of an apparatus for identity authentication, the apparatus has a computing device programmed to have functional units including: an authentication request sending unit for sending to a server a request for identity authentication corresponding to a user account; an authentication information sending unit for sending to the server authentication information of a client to allow the server to authenticate the client based on the social relationship data of the client and the social relationship data of user account related to the client; and an authentication result receiving unit for receiving from the server a reply of whether the client has passed the identity authentication.

The authentication information sending unit is used for sending the social relationship data of the client locally stored in a client device. In one embodiment, the authentication information sending unit includes: a social relationship data receiving unit for receiving from the server social relationship data of the user account; a matching result computing unit for computing a similarity as a result of matching the social relationship data of the client and the social relationship data of the user account; and a matching result sending unit for sending the similarity in the matching result to the server.

Other features of the present disclosure and advantages will be set forth in the following description, and in part will become apparent from the description, or understood by practice of the application. Purposes of this application and other advantages can be obtained by the written description, claims, and drawings of the structure particularly pointed out realized and attained.

DETAILED DESCRIPTION

The present disclosure is described in further detail in conjunction with accompanying figures and example embodiments. In the description, the term "technique(s)," for instance, may refer to a method, an apparatus device, a system, and/or computer-readable instructions as permitted by the context above and throughout the present disclosure.

In this description, the order in which a process is described is not intended to be construed as a limitation, and any number of the described process blocks may be combined in any order to implement the method, or an alternate method. An embodiment is described in sequential steps only for the convenience of illustration. Unless it would cause a conflict, the examples and embodiments described in the present disclosure, and the characteristics and features thereof, may be combined freely. Further, not every step described in the embodiments is required in order to practice the techniques of this disclosure.

Figure 1:
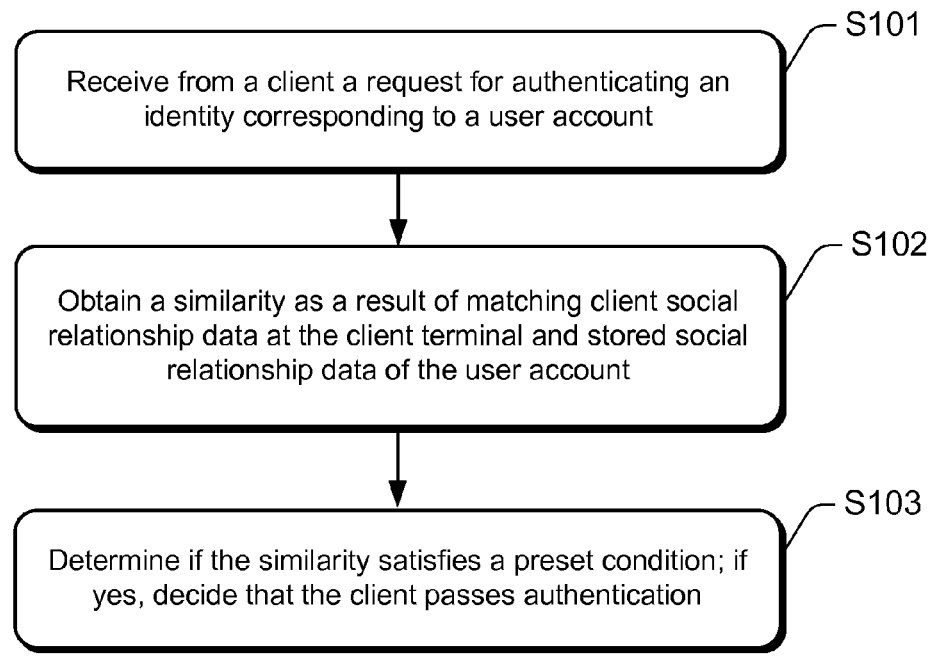
FIG. 1 is a block flow diagram of an example process for client authentication using social relationship data.

FIG. 1 is a block flow diagram of an example process for client authentication using social relationship data.

Block S101: receiving from the client a request for client identity authentication corresponding to a user account.

The method described herein is for authenticating an identity of a client using social relationship data. This description, a "client" refers to a client terminal or a client device used by the user. The method determines a similarity between the user social relationship data found at the client terminal and the stored social relationship data of the user account, by matching the two data. Whether the client passes the identity authentication is determined by the similarity determined as a result of matching. The identity authentication answers the question of whether the client terminal is owned by the owner of the particular user account.

In this description, client terminals include but are not limited to mobile devices, for example, traditional mobile phones, smart phones, personal computers, PDA, iPad, and other terminal devices. The method for identity authenticating based on social relationship data has application scenarios that are not limited to an initial device-account bonding procedure and any subsequent change of the device-account bonding, but may also include many other scenarios that need to authenticate the identity of a client terminal. For example, in order to enhance the security, an application may require a user to provide not only a correct account name and password, but also to verify that the mobile device used by the user belongs to the user. Any situation where similar identity authentication is needed, the disclosed method may be used.

To use the disclosed method, a request for identity authentication corresponding to a particular user account is first received from the client which is being authenticated. The request from the client may include an account name, a password, and other information related to the request for identity authentication. A server on which the method is implemented receives the request and first verifies the account name and the password. To do this, the server may look up in stored account information the account that corresponds to the account name provided, obtain the password information of the identified account and compare it with the received password; if the passwords match, proceed to the next operation, but if not return a reply indicating a password error.

Upon successfully verifying the account name and the password, the process proceeds to block S102 to start an operation of authenticating an identity based on social relationship data. In actual practice, a preliminary determination may be made to decide whether this additional authentication process is necessary. This determination may be made based on whether the received request contains an explicit indication of needing such authentication, whether the request indicates that the current operation conducted by the user belongs to a sensitive type (e.g., a logon, a payment, etc.), or whether the current user account has a secured level that requires such identity authentication. If the preliminary determination is affirmative, the process proceeds to block S102.

Block S102: obtaining a similarity as a result of matching client social relationship data at the client terminal and stored social relationship data of the user account.

The disclosed method of client identity authentication based on social relationship data uses the following similarity criteria: if the existing stored social relationship data of the current user account matches with a sufficiently similarity the social relationship data found at the client, the client is considered to pass the identity authentication. That is, the client terminal is considered to be owned by the user who is the owner of the current account.

The social relationship data may be any data that reflects interpersonal social relationships, and may be represented by a relational table of the social relationships between the current user account and other users. It may be characterized that the social relationship data is at least an indirect reflection of the identity of the owner of the particular user account. The disclosed method utilizes this identity-related characteristics of the social relationship data to determine whether the client being authenticated belongs to the user who owns the user account and thus can pass the identity authentication.

Take a list of phone numbers contained in the social relationship data as an example. If the list of phone numbers in the address book stored at the client is found to match with sufficient similarity the phone numbers of the user account stored at the server, it may be concluded that the client terminal belongs to the owner of the user account and thus can pass the authentication.

The social relationship data stored at the server may include a list of phone numbers, but may also include other social relationship data, for example, a list of QQ numbers of the user, a list of WeChat numbers of the user, a list of past contact numbers, and any other data that may reflect the social relationship between the current user and other users. Likewise, the social relationship data stored at the client terminal may include a list of phone numbers, but may also include other social relationship data, such as a list of QQ numbers of the user, a list of WeChat numbers of the user, a list of past contact numbers, and any other data that may reflect the social relationship between the current user and other users.

In order to obtain a similarity result of matching the social relationship data of the client terminal and the existing stored social relationship data of the user account, the social relationship data that corresponds to a user account needs to be first created. This may be done in two steps: (1) analyze collected data to extract social relationship data related to the user account; and (2) store the extracted social relationship data related to the user account, as described separately below.

(1) Analyzing Collected Data to Extract Social Relationship Data Related to the User Account:

The social relationship data is first collected. The collected data may include financial records of businesses conducted between user accounts, fund transfer records, pay-for-another records (a user pays on behalf of another), communications records, or other social networking relationship records. The data may be collected from the internal data within the server system, or be obtained from another server or system's various application data by visiting a port opened by the other server or system.

The collected data is then analyzed to extract any social relationship data related to the particular user account and remove undesired information. This process is also called data cleaning.

Data cleaning is a technique of database services. As the name suggests, data cleaning cleans out the dirty portions of the data. As the information processing technology develops, many industries and fields have accumulated a large quantity of data. Data cleaning is necessary in order to maintain data accuracy for accurately reflect the conditions of the current world and effectively support daily operations and decisions. One purpose of data cleaning is to detect inconsistencies that exist in the data, and eliminate or correct invalid data and empty data to improve the data quality. Data cleaning usually follows a certain set of rules to clean dirty data.

From another point of view, in addition to cleaning the dirty data, the data cleaning also performs data convergence, data mining and data filtering, in order to remove data that does not meet the standard, and to extract useful data. Data cleaning is useful in the present disclosure uses for above-mentioned purposes. This is because the data involved may be a collection of data from various applications. The data may not only come from different businesses and different applications, but also include historical data from different times, making data cleaning necessary. On the one hand, because the disclosed method analyzes a certain type of data (such as financial records of businesses conducted among the different accounts, transfer records, pay-for-another records, communications records, or other social networking relationship records), the other unrelated data may be considered dirty data. On the other hand, because the disclosed method extracts from collected data the social relationship data that corresponds to a particular user account, other data that is not related to the particular user account may be considered dirty data.

Data cleaning cleans out the above-mentioned types of dirty data, and at the same time uses a certain logic rules to analyze and extract a table of relationships between the particular user account and other users. For example, through data cleaning, it may be concluded that the particular account A has financial transactions with account B, while account B has registered phone number 1 as a contact, and thus phone number 1 is considered to have a social relationship with account A.

Using the above method, a list of telephone numbers having a social relationship (including financial transactions and communications) with account A may be obtained. The list may be indicated as follows: Account A/Phone Number 1; Account A/Phone Number 2; etc. Through data cleaning, other social relationship data connected with the particular account may also be obtained, as indicated as follows: Account A/QQ number 1; Account A/QQ number 2; etc.

Because the telephone communications, financial transactions and other social relationships between the users are often dynamic, the above-described data collection and data cleaning process may be carried out periodically at a back-end, in order to create most updated relationship lists, including that of the previous accounts and newly added accounts.

The periodical time settings for updating the data collection and data cleaning may vary for different implementations depending on the application scenario. It is noted that the social relationship data related to a particular user account obtained by data cleaning is not limited to phone numbers. It may be, for example, a list of social contact names related to the particular user account. These implementation variations are all within the scope of the disclosure.

(2) Storing the Extracted Social Relationship Data Related to the User Account:

The social relationship data related to the user account obtained by data cleaning is stored in a database, a data file or a data table. The stored data constitutes the stored social relationship data of the user account. The present disclosure does not restrict the manner or the format of how data is stored, as long as the social relationship data corresponding to the user account can be properly stored and retrieved when needed.

With the stored social relationship data, the process of block S102 may be carried out upon receiving from the client the social relationship data corresponding to the user account to acquire a similarity as a result of matching the social relationship data of the client and the stored social relationship data of the user account. In order to obtain the similarity, a similarity matching operation is performed. This operation may be done at the client, or done at the server. Correspondingly to these two different approaches, there may be two different ways to obtain the matching similarity. First way is to obtain the similarity at the client, while the second is to compute the similarity at the server itself. Either method may be used to implement the disclosed method. These two approaches are further described below.

(1) Similarity Matching at the Client:

With this approach, the similarity matching operation is carried out at the client. The server eventually acquires the similarity in the matching result by performing these acts: sending the stored social relationship data of the user account to the client; and receiving the similarity in the matching result from the client.

The server first sends the stored social relationship data. In order to do this, the server first looks up the stored social relationship data according to the user account, extracts the social relationship data corresponding to the user account, and then sends the extracted data to the client. In the illustrated example, the server extracts a list of social relationship telephone numbers corresponding to the user account from the stored social relationship database, and sends the list to the client. In other embodiments, different types of social relationship data, such as a list of QQ numbers or a list of social networking account numbers, may be obtained and sent to the client.

In the illustrated example where the client terminal is a mobile communications device, the server sends a list of phone numbers to the client terminal. However, in other embodiments, the client to be authenticated may not be a mobile communications device. In such situations, the type of the client to be authenticated is first determined. If it is a mobile communications device such as a traditional mobile phone or a smart phone, then the list of phone numbers (or a list of social networking contacts) corresponding to the user account is sent to the client terminal. If it is determined that the client does not have a telephone contact book (for example, in the case of a regular PC), a list of social networking contacts such as a list of QQ numbers, rather than a list of phone numbers, may be more appropriate in order for the client to perform a similarity matching operation. Variations of social relationship data sent to the client are only a matter of implementation types and do not deviate from the scope of the present disclosure.

As a simpler implementation, the social relationship data corresponding to the user account may be sent to the client with no encryption. Although this is simple to implement, it has shortcomings. Social relationship data such as social networking telephone numbers, are a part of personal information of the user, and should not be unnecessarily exposed to others for the sake of privacy. During transmission of such data, malicious attackers may obtain such information by unauthorized eavesdropping and illegally spread the information to cause security risks to the user as well as the Internet. To avoid such problems, the social relationship data is preferably encrypted before sending to the client terminal.

In one embodiment, AES (Advanced Encryption Standard) encryption algorithm is used to encrypt the social relationship data. AES is an encryption algorithm used by The National Institute of Standards and Technology (NIST)

to encrypt data. AES is one of the most popular symmetric key cryptography techniques, and is a type of reversible encryption algorithms which uses an encryption key and a decryption key that are identical to each other. If an encryption key is used to encrypt the list of social networking telephone numbers using AES algorithm, the receiving mobile communications device may use the same key to decrypt the received information and obtain the unencrypted list of social networking telephone numbers. Other encryption methods such as 3DES may also be used.

As to the encryption key management, the server and the client terminal may keep the preset key, or may use a key that is periodically updated and distributed in order to improve security. Whether encryption is to be used or not, what encryption algorithm is to be used, and what encryption key management method is to be used, may be decided according to the actual needs in different implementations, and the choices are not limited by the disclosure and do not affect the scope of the present disclosure.

Upon receiving the social relationship data corresponding to the user account, the client matches the received data with the local user's social relationship data, and sends the matching result to the server. The server then receives the matching result from the client.

The similarity in a matching result may include a matching number and/or a matching level. The matching number is defined as a total number of items that are found to match between the stored social relationship data of the user account and the social relationship data of the client, while the matching level is defined as a ratio between the matching number and a total number of items found in the stored social relationship data. For example, if the social relationship data sent to the client has a list of socially related telephone numbers of the user account, the client may extract a list of telephone numbers from the address book of the client, and compare the received list of socially related telephone numbers with the extracted list of telephone numbers of the client, to identify all phone numbers that match on both lists. The total number of phone numbers that match is the matching number.

Alternatively, the client may directly compare the received list of socially related telephone numbers with the local address book of the client. If any telephone number in the received list is also found in the local address book, it is considered a successful match. In other words, the telephone number satisfies the consistence condition in accordance with the present disclosure. In this case, the total number of telephone numbers in the received list that also appear in the local address book of the client is the matching number. If the social relationship data sent to the client has a list of QQ numbers of socially related parties, the client may use a similar method as described above to compare the received QQ numbers with the local QQ numbers to obtain a matching number.

In a specific embodiment for illustration, the stored social relationship data of the user account (i.e., the social relationship data sent to the client) is a list of socially related telephone numbers of the user account. The example list includes ten telephone numbers, of which five telephone numbers are found to be consistent (as a result of a successful match) with the telephone numbers of the local client address book. Accordingly, the similarity in the matching result received from the client has a matching number 5, and a matching level 0.5 ($5/10=0.5$).

The similarity in the matching result in the above illustrated example comprises both a matching number and a matching level. However, because either the matching number or the matching level may reflect in matching condition of the stored social relationship data of the user account and the social relationship data of the client, the client may report any one of them instead of both. The server may still be able to determine if the client can pass the identity authentication. Nevertheless, considering that the matching number and the matching level each have a different meaning and both are not belong to the same dimension, with the matching number being an absolute value representing the total number of data items that have matched successfully, while the matching level being a ratio representing a relative level of matching, it is preferred that both values are reported by the client to facilitate more accurate decision-making for identity authentication.

In other embodiments, parameters other than the matching number and/or the matching level may be used as the similarity in the matching result, as long as the parameters can sufficiently indicate a similarity between the stored social relationship data of the user account and the social relationship data of the client. Such implementations are all considered to be part of the technical schemes within the same scope of the disclosure.

In the above illustrated embodiment, the similarity in the matching result is reported upstream from the client to the server, which then determines a result of identity authentication using preset threshold values (which will be described in connection with block S103). As the variation, the preset threshold values may also be sent downstream from the server to the client, and let the client compute the matching number and/or the matching level and determine by the client itself a result of identity authentication based on the threshold values, and then report upstream the result to the server. In this case, the server receives not a matching number and/or matching level, but instead a more specific instruction according to a matching result. For example, the server may receive from the client the clear instruction whether the client has passed authentication. Such variations in which the threshold values are sent downstream to the client are considered within the scope of the disclosure.

Furthermore, the above-mentioned preset threshold values may be sent to the client along with the stored social relationship data of the user account, or be pre-stored at the client end. The latter variation avoids having to send the preset threshold values to a client for each act of authentication, and thus simplifies the procedure, while the former variation has the advantage of being easier to adjust the threshold values according to the stored social relationship data to be sent to the client. Therefore, each variation has its own benefits and shortcomings, and a selection between the two variations may be made according to the specific application needs.

(2) Similarity Matching at the Server:

Described above is an embodiment in which the similarity matching is done at a client. However, in accordance with the present disclosure, the similarity matching may be alternatively done at the server. Both approaches are within the scope of the present disclosure.

If the approach of using the server to perform similarity matching, the server takes the following steps to obtain a similarity in the matching result: the server receives from the user social relationship data stored at the client, and computes a similarity as a result of matching the social relationship data stored at the client against the social relationship data of the user account stored at the server.

With this approach, the client sends locally stored the social relationship data to the server which is used for implementing the disclosed method. In one embodiment, the client sends upstream to the server the locally stored social relationship data of the client along with the account name and the password. Alternatively, the client may send to the server the locally stored social relationship data of the client after the server has successfully verified the account name and the password. Either procedure is acceptable as long as the client and the server have a mutual understanding of the procedure.

Upon received from the client the social relationship data stored at the client, the server first determines if the received data needs decryption, and performs decryption if needed. For example, if the received data has been encrypted using the reversible encryption algorithm AES, the server decrypts the data using the same key that was used for encryption. As long as there is an agreement between the client and the server, or a clear instruction contained in the received data, to allow the server to properly perform decryption, any method of encryption may be used.

Assuming that data cleaning has generated at the server stored social relationship data corresponding to the particular user account, the server may now retrieve or extract the social relationship data of the user account in order to perform a similarity matching. For example, if the social relationship data is stored in a relational database, the server retrieves the social relationship data of the user account from the database using an SQL statement, and further retrieves therefrom the social relationship data that is consistent with the social relationship data received from the client. If permissible by the database structure, the server may directly retrieve the social relationship data that is consistent with the social relationship data received from the client. For example, if the client sends a client address book or a list of telephone numbers extracted from the client address book, the server at this step make extract a list of socially related telephone numbers from the complete social relationship data of the user account.

The server then computes a similarity as a result of matching the social relationship data stored at the client against the social relationship data of the user account stored at the server. The similarity matching process is one to compare the two social relationship data sources, one from the client and the other from the server to determine the number of data items that are found to be consistent (as a result of a successful match) in both data sources. This gives a matching number. For example, if the social relationship data received from client is a client address book, and stored social relationship data corresponding to the user account at the server include ten telephone numbers, of which five are found matching the social relationship data received from the client, the matching number in this example is therefore five.

A simplified matching process may also be used. Instead of first retrieving stored social relationship data corresponding to the user account, the received social relationship data of the client may be matched item by item directly against the stored social relationship data at the server, and the matching number may be obtained by adding up each successful match. Reduce the matching time and increase the matching efficiency, data may be sequentially ordered first or organized using a sequential structure such as a tree structure. The specific method of matching is not a part of the present disclosure, and is not restricted in any way.

In addition to the matching number, the matching level may also be calculated. In the above illustrated example, because the matching number is five, and the list of telephone number from the stored social relationship data of the user account has a total of ten telephone numbers, the matching level is calculated as $5/10=0.5$.

Above described are two alternative approaches for obtaining a similarity in the matching result. The two approaches are different from one another in that the matching operation occurs at a different place. In the first approach, the client conducts the similarity matching and reports the result upstream to the server. In the second approach, the client sends the social relationship data of the client upstream to the server to let the server compute the similarity. Functionally, these two approaches are interchangeable. In practice, however, each approach has its own strengths and shortcomings. With the client-based approach, because the client is not required to send upstream the local social relationship data, there was less privacy concern. At the same time, because the amount of data obtained at the server by data cleaning is limited, the downstream data traffic from the server to the client is also limited. With the server-based approach, the data processing may be more reliable when it is done at the server. In addition, the server acquires more complete and more reliable social relationship data by aggregating the data received from the clients. However, the upstream traffic of transferring data from the client to the server may be heavy, and there is also a concern of the privacy. Considering the characteristics of each approach, a selection may be made based on actual needs of different applications.

Block S103: determining whether the similarity meets a preset passing condition, and if affirmative, allowing the client to pass the identity authentication.

Block S102 has acquired the similarity as a result of matching data. At block S103, preset conditions are used to test whether the client may pass the identity authentication.

In this description, preset conditions for passing refer to the conditions that need to be met by the similarity in the matching result in order for the client to pass the identity authentication. Specifically, the matching number and/or the matching level is required to be, respectively, greater than (or equal or greater than) a threshold value of the matching number and/or the matching level in order to pass the identity authentication. In the illustrated example, the matching number obtained at block S102 is five, and matching level 0.5. If the preset threshold value for the matching number is four, and the preset threshold value for the matching level is 0.4, the client being authenticated is considered to have passed the identity authentication. The threshold values may be set empirically. In some embodiments, the threshold values may be adjusted according to the data item numbers and data type of the stored social relationship data, in order to improve the accuracy of authentication result.

In a stricter embodiment, Block S102 obtains the values of both a matching number and the matching level, and both values are required greater than the respective preset threshold values in order to satisfy the authentication condition. This is a more conservative approach to reduce authentication errors.

In other embodiments, however, the conditions may be relaxed. For example, Block S102 may only obtain the value of one of the matching number and the matching level to allow the authentication to be made based on the respective threshold value only. For example, if the client reports just a matching number, it is then only required that the matching number be greater than the respective threshold value. Alternatively, a condition based on a primary value may be used. For example, even if Block S102 has obtained the values of both the matching number and the matching level, Block S103 requires that only one of the two values to be satisfied as the primary value. For example, the matching level may be set as the primary value. In this case, as long as the matching level is greater than the respective preset threshold, the client is considered to have met the authentication condition regardless of whether the matching number is greater than its own respective preset value were not. Alternatively, a condition based on anyone of the two values may be used. As long as one of the matching number and the matching level satisfies its respective preset threshold, the client is considered to have met the authentication condition. In these embodiments, although the conditions may be relatively relaxed, the purpose in accordance with the present disclosure may be still achieved with the proper choice of a threshold value.

Optionally, if the similarity in the matching result fails to satisfy the preset condition of authentication, it may be further determined whether the similarity meets a preset alert condition, and if affirmative, the identity authentication is denied and an alert action is taken. Specifically, if the matching number and/or the matching level obtained at Block S102 is, respectively, less than a threshold value of the matching number and/or the matching level, it may be concluded that the client device does not belong to the owner of the particular user account, but rather likely a stolen device, and therefore the authentication should be denied and further an alert action may be taken.

Similar to the threshold values for passing authentication, the threshold values for alert may also be preset, either using fixed empirical values or variable values a dynamically adjusted according to the actual conditions. For the alert conditions, stricter requirements may be set by requiring both the matching number and the matching level to be less than the respective alert values, or less strict requirements may be set by requiring only one of the two to be less than the respective alert value, in order to deny the authentication and take an alert action.

In some embodiments as described in Block S102 where the server sends downstream the thresholds (matching number threshold for passing, matching level threshold for passing, matching number threshold for alert, and matching level threshold for alert) to the client, which computes the matching number and the matching level and directly determines whether authentication condition is met, the information received by the server at Block S102 is a clear indication whether the client has passed authentication, or whether an alert act to be taken if the authentication has failed. In this case, there's no need for the server to determine client authentication or alert conditions based on the threshold values.

The threshold values for passing and the threshold values for alert may be set to be the same values, but may also be set as different values. For example, the threshold values for passing may be greater than the respective threshold values for alert. Take the threshold degree as example. Suppose the preset threshold passing value for the matching level is 0.5, while the preset threshold alert value for the matching level is 0.2. Accordingly, a similarity in the matching result greater than 0.5 allows the client to pass authentication, a similarity in the matching result smaller than 0.2 would not only deny the client authentication but also trigger an alert action, while a similarity as a result of matching 0.2 and 0.5 would only deny the client authentication but would not trigger an alert action.

In one embodiment, if the similarity in the matching result falls between the threshold for passing and the threshold for alert, the server may take a more active approach to process. Specifically, the server may initiate a new commutation process to compute a matching condition of another social relationship data, and make a further determination based on the new matching results. For example, in addition to the telephone numbers, the server may additionally use QQ numbers to match the client data against the server data to obtain a new similarity in the matching result based on the QQ numbers, and determine whether the client can pass authentication by comparing the new similarity in the matching result against the respective threshold values. This procedure may be taken once or multiple times depending on the results and the server policies in order to more accurately authenticate the client identity.

After executing block S103, a clear conclusion has been drawn as to whether the client can pass authentication, and the server may take subsequent actions accordingly. For example, if the conclusion is that the client can pass authentication, the server sends a reply to the client to indicate identity confirmation; if the conclusion is that the client has failed authentication and further triggered an alert, the server may send a reply to the client to indicate the rejection and further lockup the user account, and notify other users. In other situations, the server may only need to send a reply to the client to indicate the rejection. Other actions may be taken according to different application needs.

In connection to the method disclosed herein, the present disclosure also provides a computer-based apparatus for implementing the method described herein.

The above-described techniques may be implemented with the help of one or more non-transitory computer-readable media containing computer-executable instructions. The non-transitory computer-executable instructions enable a computer processor to perform actions in accordance with the techniques described herein. It is appreciated that the computer readable media may be any of the suitable memory devices for storing computer data. Such memory devices include, but not limited to, hard disks, flash memory devices, optical data storages, and floppy disks. Furthermore, the computer readable media containing the computer-executable instructions may consist of component(s) in a local system or components distributed over a network of multiple remote systems. The data of the computer-executable instructions may either be delivered in a tangible physical memory device or transmitted electronically.

In the presence disclosure, a "module" in general refers to a functionality designed to perform a particular task or function. A module can be a piece of hardware, software, a plan or scheme, or a combination thereof, for effectuating a purpose associated with the particular task or function. In addition, delineation of separate modules does not necessarily suggest that physically separate devices are used. Instead, the delineation may be only functional, and the functions of several modules may be performed by a single combined device or component. When used in a computer-based system, regular computer components such as a processor, a storage and memory may be programmed to function as one or more modules to perform the various respective functions.

Figure 2:
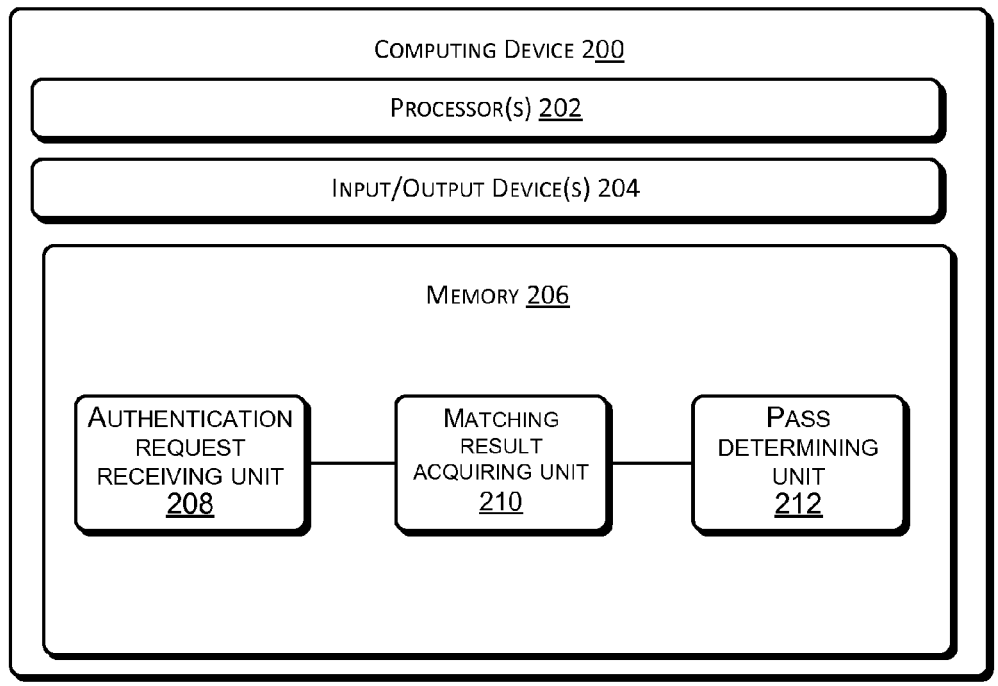
FIG. 2 is a schematic diagram of the function blocks of an example apparatus for client authentication using social relationship data.

FIG. 2 is a schematic diagram of the function blocks of an example apparatus for client authentication using social relationship data. The apparatus can be based on a typical computing device hardware which has one or more processor(s) 202, I/O devices 204, memory 206 which stores application program(s). The computing device 200 is programmed to have the following functional modules.

An authentication request receiving unit 208 is programmed for receiving from a client a request for identity authentication corresponding to a user account.

A matching result acquiring unit 210 is programmed for acquiring a similarity as a result of matching social relationship data of the client and stored social relationship data of the user account.

A pass determining unit 212 is programmed for determining whether the similarity meets a preset passing condition, and if affirmative, allowing the client to pass the identity authentication.

Furthermore, a social relationship data generating unit may be programmed for acquiring and storing the social relationship data of the user account. The social relationship data generating unit may further include an analyzing and extracting subunit for analyzing acquired data to extract social relationship data related to the user account, and a storage unit for storing the extracted social relationship data related to the user account. The stored social relationship data constitutes the stored social relationship data of the user account.

The matching result acquiring unit 210 may include a social relationship data sending subunit for sending the stored social relationship data of the user account to the client, and a matching result receiving unit for receiving from the client the result of matching the social relationship data of the client and the stored social relationship data of the user account.

The matching result acquiring unit 210 may also include a social relationship data receiving subunit for receiving from the client the social relationship data of the client, and a matching result computing unit for computing the similarity by matching the social relationship data of the client and the stored social relationship data of the user account.

The computer device 200 further may further include an alert determining unit for determining whether the similarity meets a preset alert condition, and if affirmative, denying the identity authentication and taking an alert action.

The similarity as a matching result may include a matching number and/or a matching level, as defined herein. The determination of whether the similarity meets a preset condition is described herein in relation to the method illustrated in FIG. 1, and therefore not repeated.

Figure 3:
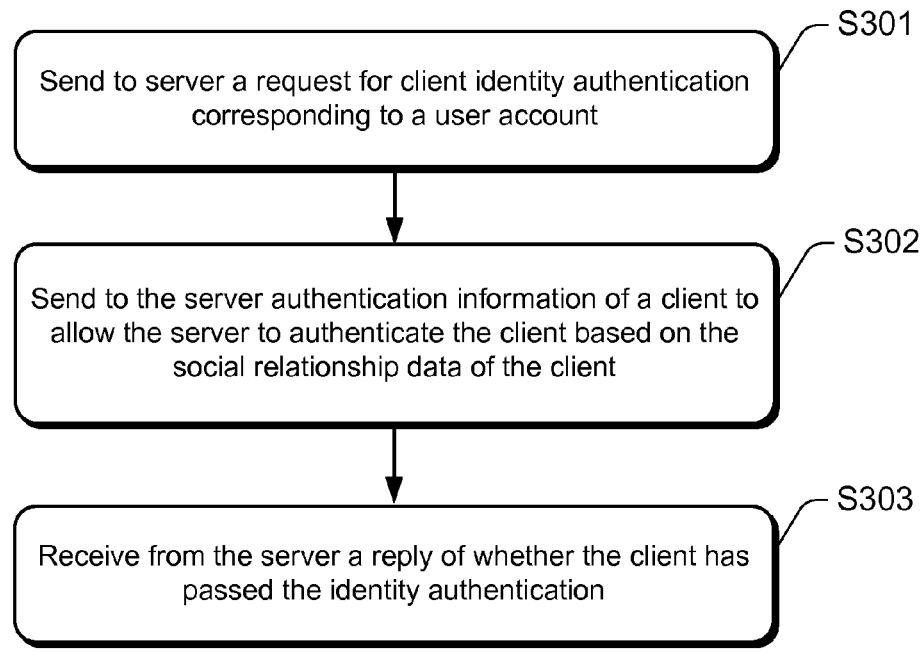
FIG. 3 is a block flow diagram of another example process of client authentication using social relationship data.

With reference to FIG. 3, a method for client authentication implemented at the client end is described as follows. This method is an alternative to the method illustrated in FIG. 1.

Block S301: sending to a server a request for identity authentication corresponding to a user account.

As the user has a need to conduct on the client device certain operations such as logon, payment, device bonding, the client application may require the user to enter through the user interface an account name, a password and other information in order to request an identity authentication. The client device sends the identity authentication request to a server on which the disclosed method for client authentication based on social relationship data is implemented. The server first verifies if the account name and the password are correct, and then determine if a process for further client identity authentication based on social relationship needs to be initiated, based on the operation being conducted by the user and the security level of the particular user account on the server.

Block S302: sending to the server authentication information of a client to allow the server to authenticate the client based on the social relationship data of the client.

This process involves determining the similarity as a result of matching the social relationship data of the client and the stored social relationship data at the server. Both approaches described herein with reference to FIGS. 1-2, namely similarity matching at the client, and similarity matching at the server, may be used.

With the client-based approach, the act of providing to the server authentication information of the client to allow the server to authenticate the client based on the social relationship data of the client involves the following steps: receiving from the server social relationship data of the user account; computing a similarity as a result of matching social relationship data of the client and the social relationship data of the user account; and sending the similarity to the server. The server uses the received similarity to determine if the client passes the identity authentication.

In some embodiments, the act of using the similarity in the matching result to determine if the client passes the identity authentication may be done at the client device. For example, if the server sends the threshold value(s) for passing authentication and the threshold value(s) for alert to the client device, along with social relationship data of the user account, or alternatively if the client device already has the necessary threshold value(s), the client device itself may compare the computed similarity in the matching result with the threshold value(s) to determine if the client passes authentication. If the client fails to pass the identity authentication, the client device may further compare the similarity in the matching result with the threshold value(s) for alert to determine if an alert action is to be taken.

In the above embodiments, the similarity in the matching result sent by the client device is not a matching number and/or a matching level, but rather more advanced information that comes from the matching results, such as whether the client has passed authentication, and whether there is a need to take an alert action.

With the server-based approach, the similarity matching is done at the server, and as a result the tasks at the client are simple, merely involving sending to the server the local social relationship data of the client. In one embodiment, the social relationship data of the client is locally stored at the client device.

Block S303: receiving from the server a reply of whether the client has passed the identity authentication.

Upon receiving the reply from the server, the client may take further actions depending on the reply. If the reply indicates that the client has passed the identity authentication, the client device is considered to belong to the owner of the user account, and therefore the user is allowed to continue to conduct the sensitive operations such as logon, payment and device bonding. If the reply indicates that the client has failed to pass the identity authentication, it suggests that the device may not belong to the owner of the user account, and therefore the user is not allowed to continue to conduct the sensitive operations. The user may be notified through a dialogue window of the user interface that the client has not passed identity authentication.

Further detailed description may refer to the description of the embodiments of FIGS. 1-2, and are not repeated.

Corresponding to the method of FIG. 3, an apparatus for client identity authentication is also described.

Figure 4:
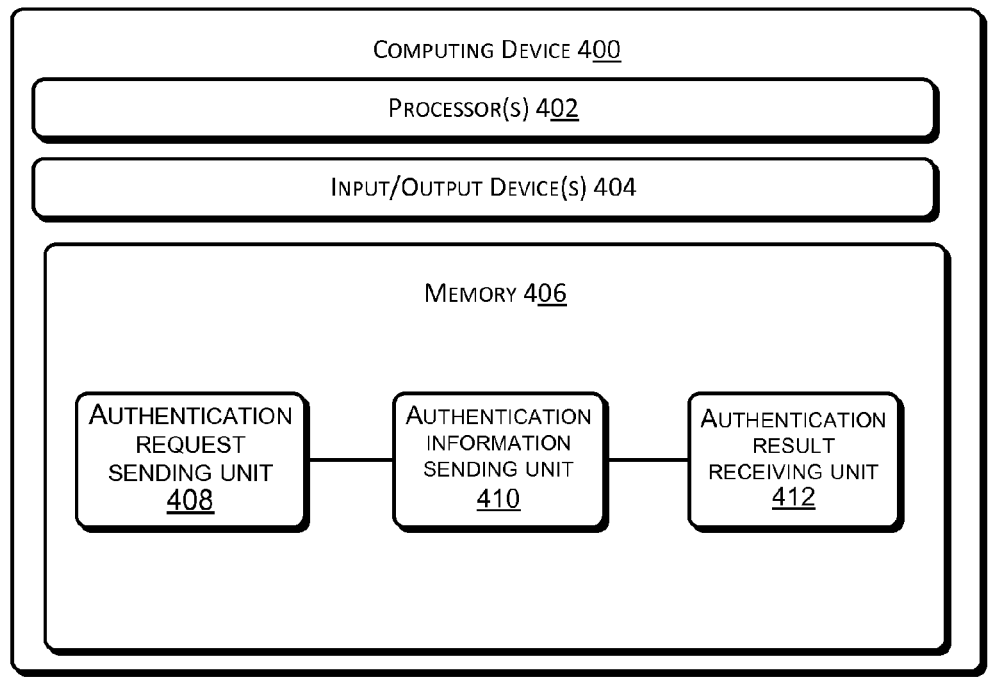
FIG. 4 is a schematic diagram of the function blocks of another example apparatus for client authentication using social relationship data.

FIG. 4 is a schematic diagram of the function blocks of an example computing device 400 for client authentication using social relationship data. The apparatus can be based on a typical computing device hardware which has one or more processor(s) 402, I/O devices 404, memory 406 which stores application program(s). The computing device 400 is programmed to have the following functional modules.

An authentication request sending unit 408 is programmed for sending to a server a request for identity authentication corresponding to a user account.

An authentication information sending unit 410 is programmed for sending to the server authentication information of a client to allow the server to authenticate the client based on the social relationship data of the client.

An authentication result receiving unit 412 is programmed for receiving from the server a reply of whether the client has passed the identity authentication.

In an embodiment, the authentication information sending unit 410 is used for sending the social relationship data of the client locally stored in a client device.

In another embodiment, the authentication information sending unit 410 includes the following units: a social relationship data receiving unit for receiving from the server social relationship data of the user account; a matching result computing unit for computing a similarity as a result of matching social relationship data of the client and the social relationship data of the user account; and a matching result sending unit for sending the similarity in the matching result to the server.

Further described is a system for client identity authentication based on social relationship data.

Figure 5:
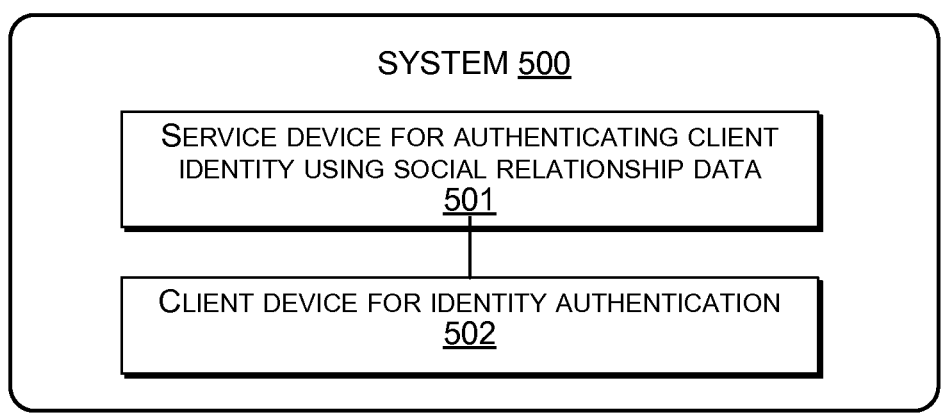
FIG. 5 is a schematic diagram of the function blocks of an example system for client authentication using social relationship data.

FIG. 5 is a schematic diagram of the function blocks of an example system for client authentication using social relationship data.

System 500 includes service device 501 for authenticating client identity using social relationship data, and client device 502 used along with service device 501 for client identity authentication. The service device 501 is preferably a server, but may be any other device that is programmed to authenticate client identity using social relationship data in accordance with the present disclosure. The client device 502 is usually a mobile communications device, a personal computer, a PDA, or an iPad. For example, the client device 502 may be a smart phone capable of communicating with the service device 501 to upload or download necessary data, such as locally stored social relationship data and similarity results of matching the social relationship data of the client device 502 with the social relationship data stored at the service device 501. The service device 501 may be deployed on a server in communication with the client device 502 to perform server-side functions as described herein.

The technique described in the present disclosure may be implemented in a general computing equipment or environment or a specialized computing equipment or environment, including but not limited to personal computers, server computers, hand-held devices or portable devices, tablet devices, multiprocessor systems, microprocessor-based systems, set-top boxes, programmable consumer devices, network PCs, microcomputers and large-scale mainframe computers, or any distributed environment including one or more of the above examples.

In a typical configuration, a computing device includes one or more processors (CPU), input/output interfaces, network interfaces, and memory.

The memory may include a computer-readable medium such as a volatile memory, random access memory (RAM) and/or other forms of nonvolatile memory, such as read only memory (ROM) or flash memory (flash RAM). The internal memory of a computing device is a type of computer-readable memory medium.

The computer-readable media include permanent and non-permanent, removable and non-removable media, and may be formed in any method or technology for storage of information. Information stored may be a set of computer-readable instructions, data structures, program modules or other data. Examples of the computer storage media include, but are not limited to, phase-change memory (PRAM), a static random access memory (SRAM), dynamic random access memory (DRAM), other types of random access memory (RAM), read-only memory (ROM), electrically erasable programmable read-only memory (EEPROM), flash memory or other memory technology, CD-ROM read-only memory (CD-ROM), digital versatile disc (DVD) or other optical storages, magnetic cassettes, magnetic tape disk storage or other magnetic storage devices, or any other non-transmission medium that may be used to store information accessible by a computing device. According to definitions of the present disclosure, computer-readable media do not include temporary computer readable media (transitory media), such as a modulated data signal and a carrier wave.

The modules in particular may be implemented using computer program modules based on machine executable commands and codes. Generally, a computer program module may perform particular tasks or implement particular abstract data types of routines, programs, objects, components, data structures, and so on. Techniques described in the present disclosure can also be practiced in distributed computing environments, such a distributed computing environment, to perform the tasks by remote processing devices connected through a communication network. In a distributed computing environment, program modules may be located in either local or remote computer storage media including memory devices.

Various embodiments of the present specification are described progressively increased details with examples and environments. Each embodiment may focus a certain aspect of the disclosure, and therefore different embodiments may differ from one another, but may also share similar parts.

Exemplary embodiments are employed to illustrate the concept and implementation of the present invention in this disclosure. The exemplary embodiments are only used for better understanding of the method and the core concepts of the present disclosure. Based on the concepts in this disclosure, one of ordinary skills in the art may modify the exemplary embodiments and application fields.

What is claimed is:

1. A method for client authentication, the method comprising:
   receiving from a client a request for identity authentication corresponding to a user account;
   acquiring a social relationship similarity as a result of matching social relationship data of the client locally stored in a client device and stored social relationship data of the user account; and
   determining whether the social relationship similarity meets a preset passing condition:
       upon determining that the social relationship similarity meets the preset passing condition, allowing the client to pass the identity authentication, or
       upon determining that the social relationship similarity fails to meet the preset passing condition, determining whether the social relationship similarity meets a preset alert condition,
           if affirmative, denying the identity authentication and taking an alert action, or if negative, denying the identity authentication without taking the alert action, acquiring another social relationship similarity as a result of matching another social relationship data of the client and the stored social relationship data of the user account, and upon determining that the other social relationship similarity meets the preset passing condition, allowing the client to pass the identity authentication.

2. The method as recited in claim 1, wherein the stored social relationship data of the user account is obtained by:
analyzing collected data to extract social relationship data related to the user account; and
storing the extracted social relationship data related to the user account.

3. The method as recited in claim 1, wherein acquiring the social relationship similarity comprises:
sending the stored social relationship data of the user account to the client; and
receiving from the client the result of matching the social relationship data of the client and the stored social relationship data of the user account.

4. The method as recited in claim 1, wherein acquiring the social relationship similarity as the result of matching social relationship data of the client and the stored social relationship data of the user account comprises:
receiving from the client the social relationship data of the client; and
computing the similarity by matching the social relationship data of the client and the stored social relationship data of the user account.

5. The method as recited in claim 1, wherein the social relationship similarity comprises at least one of a matching number or a matching level, the matching number being defined as a total number of items that are found to match between the stored social relationship data of the user account and the social relationship data of the client, and the matching level being defined as a ratio between the matching number and a total number of items found in the stored social relationship data.

6. The method as recited in claim 5, wherein determining whether the social relationship similarity meets the preset passing condition comprises at least one of:
determining whether the matching number is greater than a threshold value of the matching number, or
determining whether the matching level is greater than a threshold value of the matching level.

7. The method as recited in claim 5, wherein the preset alert condition includes that the matching number and/or the matching level is, respectively, less than a threshold value of the matching number and/or the matching level.

8. The method as recited in claim 1, wherein the social relationship data includes any of a phone number, an instant communication application number, a correspondence account number, an address book, or a pay-for-another record.

9. An apparatus for identity authentication, the apparatus comprising a computing device having a processor, computer-readable memory and storage medium, and Input/Output (I/O) devices, wherein the computing device is programmed to have functional units including:
an authentication request receiving unit for receiving from a client a request for identity authentication corresponding to a user account;
a matching result acquiring unit for acquiring a social relationship similarity as a result of matching social relationship data of the client locally stored in a client device and stored social relationship data of the user account;
a pass determining unit for determining whether the social relationship similarity meets a preset passing condition, and if affirmative, allowing the client to pass the identity authentication; and
an alert determining unit for determining, in response to the pass determining unit determining that the social relationship similarity fails to meet the preset passing condition, whether the social relationship similarity meets a preset alert condition:
if affirmative, denying the identity authentication and taking an alert action, or
if negative, denying the identity authentication without taking the alert action, wherein the matching result acquiring unit acquires another social relationship similarity as a result of matching another social relationship data of the client and the stored social relationship data of the user account, and in response to the pass determining unit further determining that the other social relationship similarity meets the preset passing condition, allowing the client to pass the identity authentication.

10. The apparatus as recited in claim 9, further comprising social relationship data generating unit for acquiring and storing the social relationship data of the user account, wherein the social relationship data generating unit further includes:
an analyzing and extracting subunit for analyzing acquired data to extract social relationship data related to the user account; and
a storage unit for storing the extracted social relationship data related to the user account, the stored social relationship data constituting the stored social relationship data of the user account.

11. The apparatus as recited in claim 9, wherein the matching result acquiring unit comprises:
a social relationship data sending subunit for sending the stored social relationship data of the user account to the client; and
a matching result receiving unit for receiving from the client the result of matching the social relationship data of the client and the stored social relationship data of the user account.

12. The apparatus as recited in claim 9, wherein the matching result acquiring unit comprises:
a social relationship data receiving subunit for receiving from the client the social relationship data of the client; and
a matching result computing unit for computing the social relationship similarity by matching the social relationship data of the client and the stored social relationship data of the user account.

13. The apparatus as recited in claim 9, wherein the social relationship similarity comprises at least one of a matching number or a matching level, the matching number being defined as a total number of items that are found to match between the stored social relationship data of the user account and the social relationship data of the client, and the matching level being defined as a ratio between the matching number and a total number of items found in the stored social relationship data.

14. The apparatus as recited in claim 13, wherein determining whether the social relationship similarity meets the preset passing condition comprises at least one of:

determining whether the matching number is greater than a threshold value of the matching number, or determining whether the matching level is greater than a threshold value of the matching level.

15. A method for client authentication, the method comprising:
   sending to a server a request for identity authentication corresponding to a user account;
   sending to the server authentication information of a client to allow the server to authenticate the client based on social relationship data of the client locally stored in a client device;
   receiving from the server a reply of whether the client has passed the identity authentication; and
   upon receiving the reply that the client has failed the identity authentication, sending to the server another request for determining whether the authentication information meets a preset alert condition:
      if affirmative, taking an alert action, or
      if negative:
         sending to the server another authentication information of the client,
         receiving from the server another reply of whether the client has passed the identity authentication based on the other authentication information.

16. The method as recited in claim 15, wherein the social relationship data of the client is locally stored in the client.

17. The method as recited in claim 15, wherein sending to the server the authentication information of the client comprises:
   receiving from the server the social relationship data of the user account;
   computing a similarity as a result of matching the social relationship data of the client and the social relationship data of the user account; and
   sending the similarity in the matching result to the server.

18. An apparatus for identity authentication, the apparatus comprising a computing device having a processor, computer-readable memory and storage medium, and I/O devices, wherein the computing device is programmed to have functional units including:
   an authentication request sending unit for sending to a server a request for identity authentication of a client;
   an authentication information sending unit for sending to the server authentication information of the client to allow the server to authenticate the client based on social relationship data of the client locally stored in a client device and stored social relationship data of a user account related to the client; and
   an authentication result receiving unit for receiving from the server a reply of whether the client has passed the identity authentication,
   wherein, in response to the authentication result receiving unit receiving from the server the reply that the client has failed the identity authentication and a preset alert condition:
      the authentication information sending unit sends to the server another authentication information of the client to allow the server to authenticate the client based on another social relationship data of the client and stored social relationship data of a user account related to the client, and
      the authentication result receiving unit receives from the server another reply of whether the client has passed the identity authentication based on the other authentication information.

19. The apparatus as recited in claim 18, wherein the authentication information sending unit is used for sending the social relationship data of the client locally stored at the client.

20. The apparatus as recited in claim 18, wherein the authentication information sending unit comprises:
   a social relationship data receiving unit for receiving from the server the stored social relationship data of the user account;
   a matching result computing unit for computing a similarity as a result of matching the social relationship data of the client and the social relationship data of the user account; and
   a matching result sending unit for sending the similarity in the matching result to the server.

* * * * *